(12) United States Patent
Iribe

(10) Patent No.: US 7,061,200 B2
(45) Date of Patent: Jun. 13, 2006

(54) LEGGED MOBILE ROBOT AND ACTUATOR DEVICE APPLICABLE TO JOIN SHAFT OF THE ROBOT

(75) Inventor: Masatsugu Iribe, Tokyo (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 10/731,155

(22) Filed: Dec. 10, 2003

(65) Prior Publication Data

US 2004/0164697 A1 Aug. 26, 2004

(30) Foreign Application Priority Data

Dec. 11, 2002 (JP) ............................. 2002-358859

(51) Int. Cl.
*B62D 57/02* (2006.01)
(52) U.S. Cl. ..................... 318/568.16; 318/568.12; 318/625; 901/46; 180/8.5
(58) Field of Classification Search ........... 318/568.11, 318/568.12, 568.16, 625; 180/8.5, 8.6; 901/1, 901/46

See application file for complete search history.

(56) References Cited

U.S. PATENT DOCUMENTS

| 5,445,235 | A | * | 8/1995 | Gomi et al. ................. 180/8.6 |
| 5,841,258 | A | * | 11/1998 | Takenaka ............... 318/568.12 |
| 5,974,366 | A | * | 10/1999 | Kawai et al. ............... 702/150 |
| 6,177,776 | B1 | * | 1/2001 | Kawai et al. ........... 318/568.12 |
| 6,538,410 | B1 | * | 3/2003 | Mori et al. ............ 318/568.12 |
| 6,802,382 | B1 | * | 10/2004 | Hattori et al. ............... 180/8.6 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

In order to suitably intercommunicate an output signal from a sensor arranged outside an actuator with a higher-order control system, an output from a contact sensor at an arbitrary position on a robot is entered to a nearest actuator device in that a wiring route is the shortest (or joint driving is not interfered therewith). Then, in the actuator device, the output of the outside sensor is processed to remove noise and sensor information is computed, and the processed results are bus-transmitted to the higher-order control system together with a drive-control signal of the actuator and sensor information from sensors housed in the actuator.

10 Claims, 12 Drawing Sheets

LEGGED MOBILE ROBOT AND ACTUATOR DEVICE APPLICABLE TO JOIN SHAFT OF THE ROBOT

BACKGROUND OF THE INVENTION

1. Field of the Invention

The present invention relates to a legged mobile robot having at least a plurality of movable legs and to an actuator device applicable to a joint shaft of the legged mobile robot, and in particular relates to a legged mobile robot having sensors, such as an acceleration sensor, an angular velocity sensor, and a torque sensor, for detecting actuator driving situations and sensors, such as a touch sensor and a pressure sensitive sensor, for detecting contact and collision with surroundings and to the actuator device applicable to the joint shaft of the legged mobile robot.

In more detail, the present invention relates to a legged mobile robot having sensors, such as a position sensor, an acceleration sensor, an angular velocity sensor, and a torque sensor, housed every joint actuator for detecting actuator driving situations, and sensors arranged outside the actuator for detecting contact and collision with surroundings and to the actuator device applicable to the joint shaft of the legged mobile robot, and in particular it relates to a legged mobile robot suitably communicating signals for drive-controlling each joint actuator, output signals from the sensors housed in the actuator, and output signals from the sensors arranged outside the actuator with a higher-order control system and to the actuator device applicable to the joint shaft of the legged mobile robot.

2. Description of the Related Art

A "robot" means a mechanical apparatus simulating a human movement using electrical and magnetic functions. The etymology of the robot is a Slavic "ROBOTA (slave machine)". In Japan, the robot has been widely used from the late 1960s, and many of the robots at that time are industrial robots, such as manipulators and carrier robots, for automating and unmanning manufacturing operations in factories.

By a floor-type robot, such as an armed robot, component assembling and selecting are performed only within a fixed and local operating space by being transplanted at a specific position. Whereas, the operating space of a mobile robot is non-restrictive, so that the mobile robot can carry out pre-determined or arbitrary operation for a human, and provides various wide services instead of a living matter, such as a human and a dog, by freely moving along a route or a non-route. Among them, a legged mobile robot is excellent in that it can achieve flexible walking operation, such as moving up and down a step or a ladder and hurdling obstacles, regardless of a non-finished ground, although the legged mobile robot is unstable and difficult to be controlled in attitude and walking in comparison with a crawler-mounted robot and a tire-mounted robot.

Recently, the research and development have been progressed about legged mobile robots such as a pet-type robot simulating the physical mechanism and operation of four-footed animals, such as dogs and cats, and a human-shaped or human-type robot called as a humanoid robot designed by simulating the physical mechanism and operation of two-footed animals, such as a human, waling in erected posture as a model, so that the practical application thereof is expected.

A legged mobile robot reproducing a human living body mechanism is called as a human-shaped or a human-type robot (humanoid robot). The human-type robot can support human activities in various situations of every day life under living conditions.

Almost the entire human operational space and living space are formed corresponding to the physical mechanism or the behavior pattern of two-footed walking humans, so that there are a number of obstacles, against which a present mechanical system must move using driving devices such as wheels as a moving unit. Therefore, in order to act for various human operations and to deeply infiltrate into a human living space for a mechanical system, i.e., a robot, it is preferable that the movable range of the robot be substantially the same as that of a human. This is also a reason for that the practical application of legged mobile robots is expected.

Such a legged mobile robot generally has a number of degrees of joint freedom so as to achieve joint operation with actuator motors. Also, by servo controlling with a rotational position and a rotational amount derived of each motor, a desired operational pattern is reproduced while a posture is controlled.

A servomotor making up the joint freedom must be designed and manufactured in a small size and high performance. Therefore, there has already been a small-sized and gear direct-attachment type AC servomotor having a servo-control system built therein and applicable to a joint actuator of the legged mobile robot (see Japanese Unexamined Patent Application Publication No. 2000-299970, for example).

However, in a conventional unitized actuator, harnesses for a power supply and control signals are exposed from an actuator body. Also, to an output shaft connected to a rotor of an actuator motor, only a mechanism to be connected to a structural member is added.

Therefore, for a user (or a designer), in order to construct a multispindle robot using such an actuator unit, it is necessary to design a harness to be routed through various movable units.

Most proposals about the attitude stable control or the prevention from overturning during walking are using a ZMP (zero moment point) as the norm for determining the degree of stability (see "LEGGED LOCOMOTION ROBOTS" by Miomir Vukobratovic, and "HOKOURO-BOTTO TO JINKOU NO ASHI (WALING ROBOT AND ARTIFICIAL LEGS)" by Ichirou KATO et al., and published from THE NIKKAN KOGYO SHIMBUN, LTD., for example). By two-footed walking pattern generated based on the ZMP norm, there are advantages that a landing site of a sole can be set in advance, and that kinematic restriction conditions of the front leg may be easily considered. Also, the ZMP as the norm for determining the stability does not mean a force but a trajectory as the desired value of the motion control, so that technically achieving expectation is increased.

When strictly controlling the movement of a legged robot according to a ZMP equation, an acceleration in a world coordinate limited to a local coordinate used in the control, a position (posture) and an acceleration at each region of the robot in a local coordinate system, a ZMP position, an external force, an external force moment are measured so as to introduce the measured results in the ZMP equation. Thereby, the position and the acceleration at each region can be controlled while an unknown external force moment and an unknown external force are identified so as to strictly control the movement.

For example, one clinometer (or one acceleration meter) and one gyroscope arranged at each of shafts (pitch, roll, and yaw) (X, Y, and Z) so as to have a six-shaft force arrangement are arranged at each region having an external force applied or assumed to have an external force applied and at a position separated to that having the external force applied in practice for controlling the movement with the minimum number of sensors. However, in the movement control system with such sensor arrangement, it is difficult to directly measure and control the positions and accelerations at the entire regions in addition to the accelerations limited to the local coordinate used in the control. This cannot assure the movement control of a robot aimed at the stable walking on a ground such as gravel and a thick carpet, which are liable to move if a force or a torque is applied, and a tile in a residence liable to produce slippage with a small frictional coefficient when moving in parallel; and at gross movement including jumping by adding flexibility to the robot itself.

Whereas there is a proposal that an acceleration sensor, an angular velocity sensor, and a velocity sensor for directly measuring a local coordinate used for the control and its coordinate are arranged every control point and an acceleration sensor and a posture sensor are further arranged every vector position used in a computation model (see Japanese Patent Application No. 2002-297207, for example). Thereby, a control parameter value necessary for introducing the ZMP equation (or an equation of motion) can be directly measured. As a result, the strict motion control can be achieved with good responsiveness and without the assumption that the robot is rigid and does not deflect by an applied external force.

However, in order to make assurance of the posture-stability control of the robot, acceleration sensors, angular velocity sensors, and velocity sensors need to be compactly arranged in various regions of the robot for transmitting sensor outputs from locals to the central control unit. In such a case, it is necessary to design harness to be routed through various movable units.

In such a legged mobile robot with a high degree of freedom having mechanical movable units so as to exchange information with a human for entertainment, there are various situations deviated from the operation condition assured by the control system of the robot. For example, in a case where a human exchanges information by touching a robot, different from a toy robot, it is difficult for a user to expect the robot operation, so that there is a problem of a danger that a finger, etc., is pinched by the movable unit. There is also a problem that a user is difficult to enjoy the information exchange by awful feeling due to the danger.

Accordingly, there is a system proposal that torque sensors are arranged at joint regions, each having a wide movable range and being in danger of pinching or catching a user, so as to automatically detect the pinching or the catching based on the sensor output (see Japanese Unexamined Patent Application Publication No. 2002-342963, for example). In this case, upon detecting pinching a user' finger, etc., at a predetermined region, the legged mobile robot executes the operation for avoiding this. Thereby, the robot aimed at to exchange information with a human for entertainment can be prevented from the danger in that a finger or the like is pinched by the movement of the movable unit. In this case, there are advantages that a protective robot is provided and information exchange can be enjoyed with the robot at ease without awful feeling.

However, in order to further make assurance of avoiding the danger during movable time of the robot, torque sensors and temperature sensors need to be compactly arranged in various joint regions of the robot. With regard to the pinching and the interference with another object in detail, only the sensor information inside the actuator, such as torque detection, is insufficient so that sensor information from a sensor, such as a pressure-sensitive sensor, disposed outside the casing is required.

In such a case, in order to transmit sensor outputs from locals to the central control unit, it is necessary to design harness to be routed through various movable units.

When signal lines for transmitting sensor signals of the above-mentioned sensors are viewed in addition to signal lines for drive controlling actuators, it is impossible to design harness to be routed.

SUMMARY OF THE INVENTION

Accordingly, it is an object of the present invention to provide a legged mobile robot, which have sensors, such as a position sensor, an acceleration sensor, an angular velocity sensor, and a torque sensor, for detecting actuator driving situations and sensors, such as a contact sensor and a pressure sensitive sensor, for detecting contact and collision with surroundings; and an actuator device applicable to a joint shaft of the legged mobile robot.

It is another object of the present invention to provide an excellent legged mobile robot, which house sensors, such as a position sensor, an acceleration sensor, an angular velocity sensor, and a torque sensor, for detecting actuator driving situations for each joint actuator and also have sensors arranged outside actuators for detecting contact and collision with surroundings; and an actuator device applicable to a joint shaft of the legged mobile robot.

It is still another object of the present invention to provide an excellent legged mobile robot, which can preferably communicate drive control signals of each joint actuator, output signals of sensors housed in the actuator, and output signals of sensors arrange outside actuators with a higher-order control system; and an actuator device applicable to a joint shaft of the legged mobile robot.

The present invention has been made in view of the objects described above, and a legged mobile robot according to a first aspect of the present invention comprises at least a plurality of movable legs; actuator devices for achieving the degree of freedom of each joint; a higher-order control system for controlling operation of the robot as a whole; sensors, such as a position sensor, an acceralation sensor, an angular velocity sensor, and a torque sensor, housed in every joint-actuator device for detecting driving situations of the actuator device; and a sensor disposed outside the actuator device for detecting contact and collision with surroundings, wherein the actuator device comprises an input interface for receiving a sensor signal from at least the one sensor disposed outside the actuator device; a signal processing unit for removing noise from sensor signals received from the housed sensors and the outside sensor; and an arithmetic processing unit for drive-controlling an actuator motor and for processing sensor-information according to a command from the higher-order control system.

In a legged mobile robot according to the first aspect, preferably, each actuator constituting the degree of joint freedom of the robot has sensors, such as a position sensor, an acceleration sensor, an angular velocity sensor, a temperature sensor, and a torque sensor, housed therein for detecting information about actuator driving.

Also, preferably, the legged mobile robot further comprises a bus (common signal line) provided on the robot for interconnecting the actuator devices, and via the bus, actuator drive-control signals are transmitted to and from the higher-order control system and also sensor information is transmitted from the sensors housed in the actuator device and the sensor disposed outside the actuator device. Such a bus can be designed in conformity to the bus-interface standards such as the USB (universal serial bus) so as to achieve high-speed serial communication.

The actuator device comprises an input interface for receiving at least one sensor signal from the contact sensor disposed outside the actuator device and the other sensors, and a signal processing unit having a computing function for receiving at least one sensor input. Furthermore, the processed results of a sensor signal received from the outside sensor are bus-transmitted by a bus interface of the actuator device.

Also, preferably, the output from a contact sensor at an arbitrary position on the robot is entered to a nearest actuator device in that a wiring route is the shortest (or joint driving is not interfered therewith). Then, in the actuator device, outputs of the outside sensors are processed to remove noise and sensor information is computed, and the processed results are bus-transmitted to the higher-order control system together with drive-control signals of the actuator and sensor information from sensors housed in the actuator.

That is, the drive-control signals of the actuator and sensor information from sensors housed in the actuator and sensors disposed outside the actuator device are entirely transmitted to the higher-order control system using the bus.

Accordingly, this can solve the problems of the floating capacitance effect and that high-frequency noise is overlapped on the signal by the increased wiring impedance during transmitting sensor information from sensors arranged outside the actuator device to the higher-order control system. Since the wiring structure of the robot can be simplified, designing is facilitated so as to solve the problems of increased operation load followed by excessive wiring amount and of damaged wiring due to operation repetition.

Also, by providing a hub device concentrating transmission signal lines every movable unit in the bilateral leg sections and arm sections, the wiring structure may be further simplified.

An actuator device according to a second aspect of the present invention and being applicable to a joint shaft of a legged mobile robot, the actuator device comprises an actuator motor; a sensor, such as a position sensor, an acceralation sensor, an angular velocity sensor, and a torque sensor, housed in the device for detecting actuator driving situations; an input interface for receiving sensor signals from at least one outside sensor disposed outside the device; a signal processing unit for removing noise from sensor signals from the sensor housed in the device and from the outside sensor; a bus interface for transmitting actuator drive-control signals to and from a higher-order control system and also for transmitting sensor information from the sensor housed in the actuator device and the sensor disposed outside the actuator device via a bus; and an arithmetic processing unit for drive-controlling the actuator motor and for processing sensor information according to a command from the higher-order control system.

Preferably, the sensor housed in the device comprises at least one of a position sensor, an acceralation sensor, an angular velocity sensor, a torque sensor, and a temperature sensor.

Preferably, the outside sensor is one of a contact sensor and a pressure-sensitive sensor for detecting contact and collision with surroundings.

When the actuator device is incorporated to the joint shaft of the legged mobile robot, sensor signals may be received from the nearest outside sensor via the input interface so as to reduce a wiring route length to the shortest.

According to the actuator device of the second aspect of the present invention, the drive-control signals of the actuator and sensor information from sensors housed in the actuator and sensors disposed outside the actuator device are entirely transmitted to the higher-order control system using the bus.

Accordingly, this can solve the problems of the floating capacitance effect and that high-frequency noise is overlapped on the signal by the increased wiring impedance during transmitting sensor information from sensors arranged outside the actuator device to the higher-order control system. Since the wiring structure of the robot can be simplified, designing is facilitated so as to solve the problems of increased operation load followed by excessive wiring amount and of damaged wiring due to operation repetition.

As described above in detail, according to the present invention, there can be provided an excellent legged mobile robot, which house sensors, such as a position sensor, an acceleration sensor, an angular velocity sensor, and a torque sensor, for detecting actuator driving situations for each joint actuator and also have sensors arranged outside actuators for detecting contact and collision with surroundings; and an actuator device applicable to a joint shaft of the legged mobile robot.

Also, according to the present invention, there can be provided an excellent legged mobile robot, which can suitably communicate drive control signals of each joint actuator, output signals of sensors housed in the actuator, and output signals of sensors arrange outside actuators with a higher-order control system; and an actuator device applicable to a joint shaft of the legged mobile robot.

While the present invention will hereinafter be described in detail in connection with embodiments and the attached drawings, still another objects, features, and advantages of the present invention will be understood.

DESCRIPTION OF THE PREFERRED EMBODIMENTS

Embodiments according to the present invention will be described below in detail with reference to the drawings.

Figure 1:
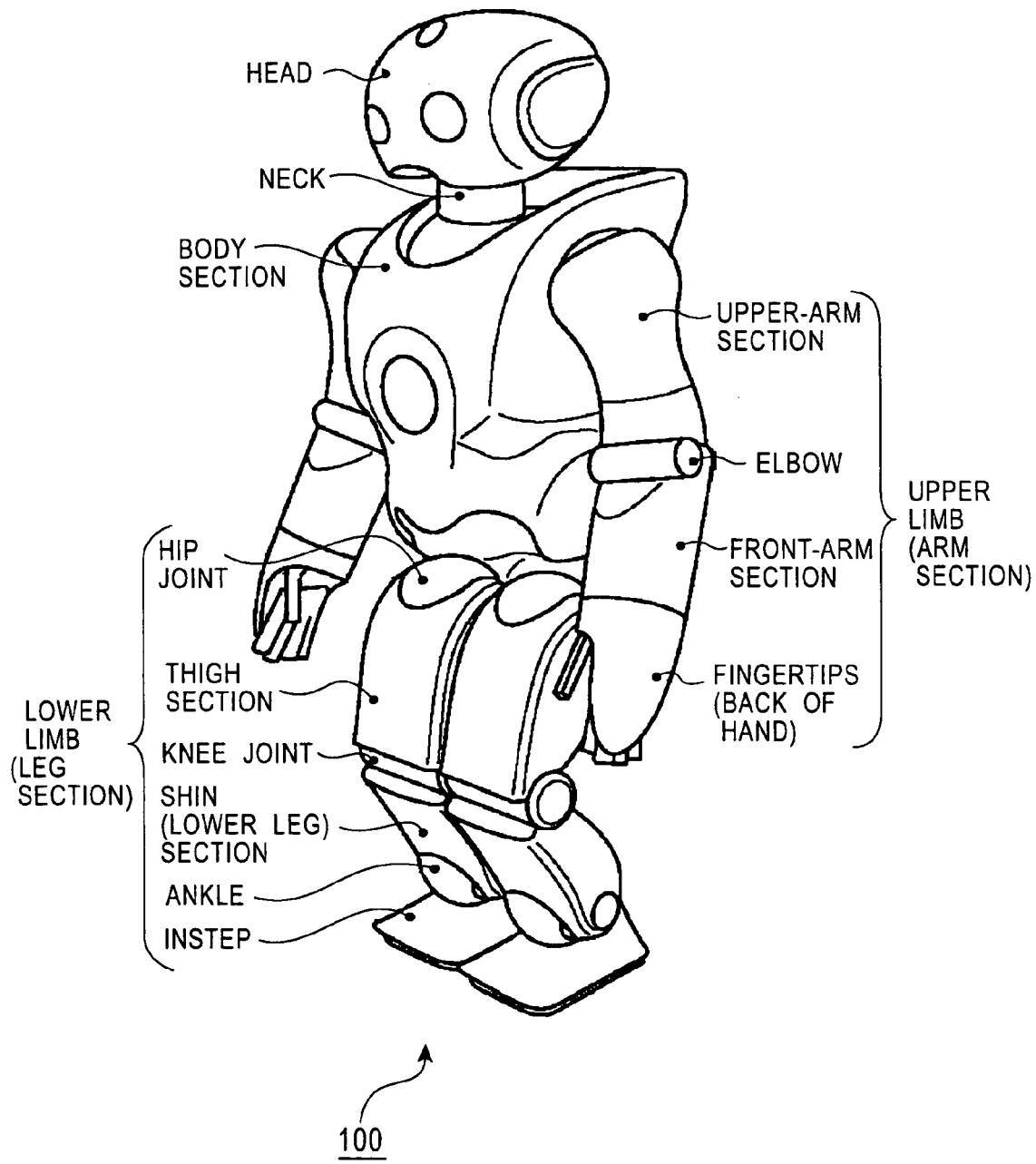
FIG. 1 is a front external view of a standing legged mobile robot according to an embodiment of the present invention.
Figure 2:
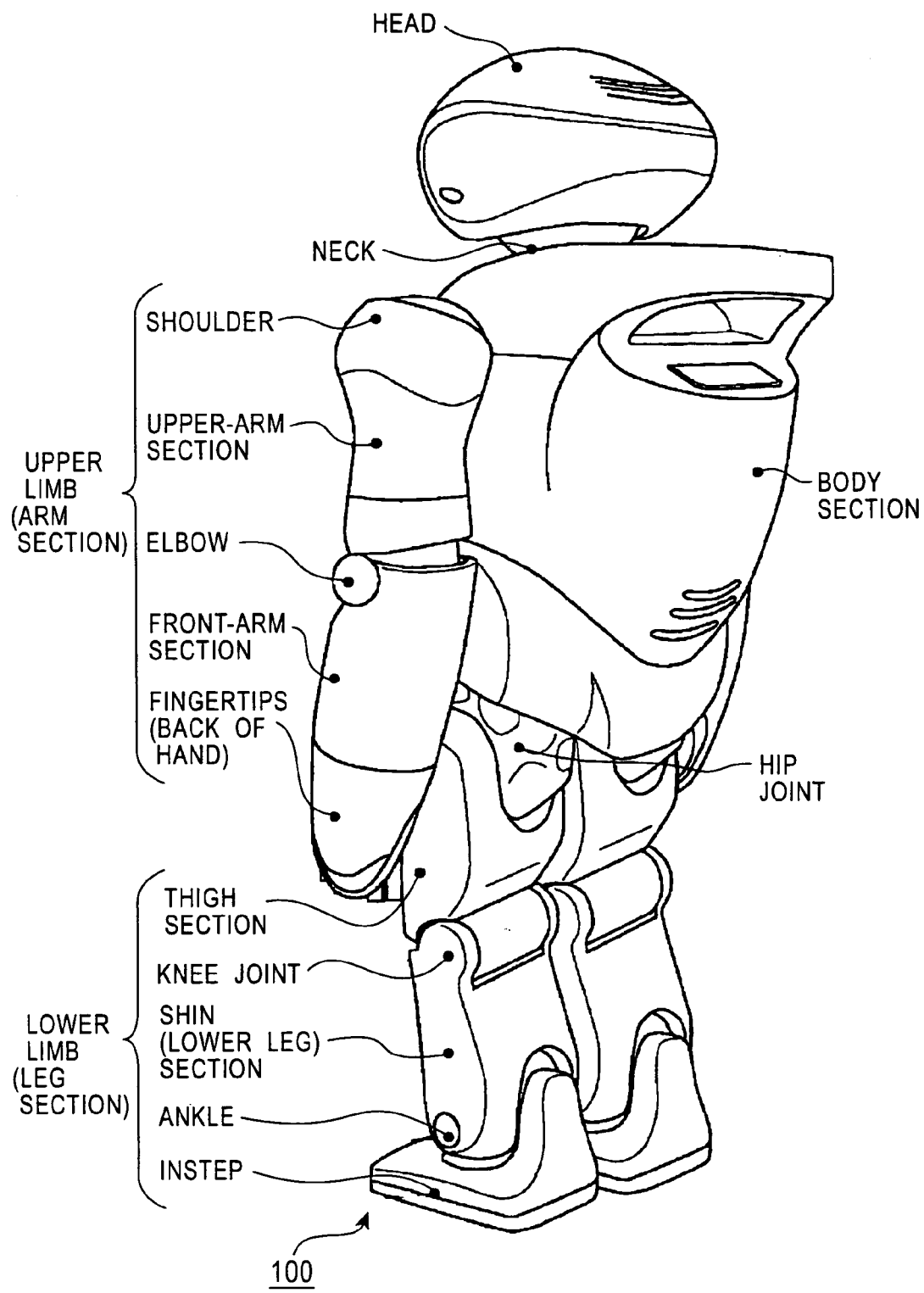
FIG. 2 is a rear external view of a standing legged mobile robot according to an embodiment of the present invention.

FIGS. 1 and 2 are external views of a legged mobile robot 100 according to an embodiment of the present invention. The legged mobile robot 100 is so-called "human-shaped" or "human-type" having two legs and two arms. The legged mobile robot 100 is composed of a body section, a head, bilateral upper limbs, and bilateral leg sections performing legged-movement, and the operation of the robot is generally controlled by a control unit (not shown) housed in a body, for example.

The leg section is composed of a thigh section, a knee joint, a shin section, an ankle, and an instep, and is connected to the substantially lower end of a body with a hip joint. The upper limb is composed of an upper arm, an elbow joint, and a front arm, and is connected to each of bilateral upper side-edges of the body with a shoulder joint. The head is connected to the substantially upper end of the body with a neck joint.

The control unit is composed of a controller (principal control unit) for drive-controlling joint actuators constituting the legged mobile robot 100 and for processing external inputs from various sensors (will be described later) and a casing having a power supply circuit and other peripheral devices mounted thereon. The control unit may include a communication interface for remote control and a communication device.

Figure 3:
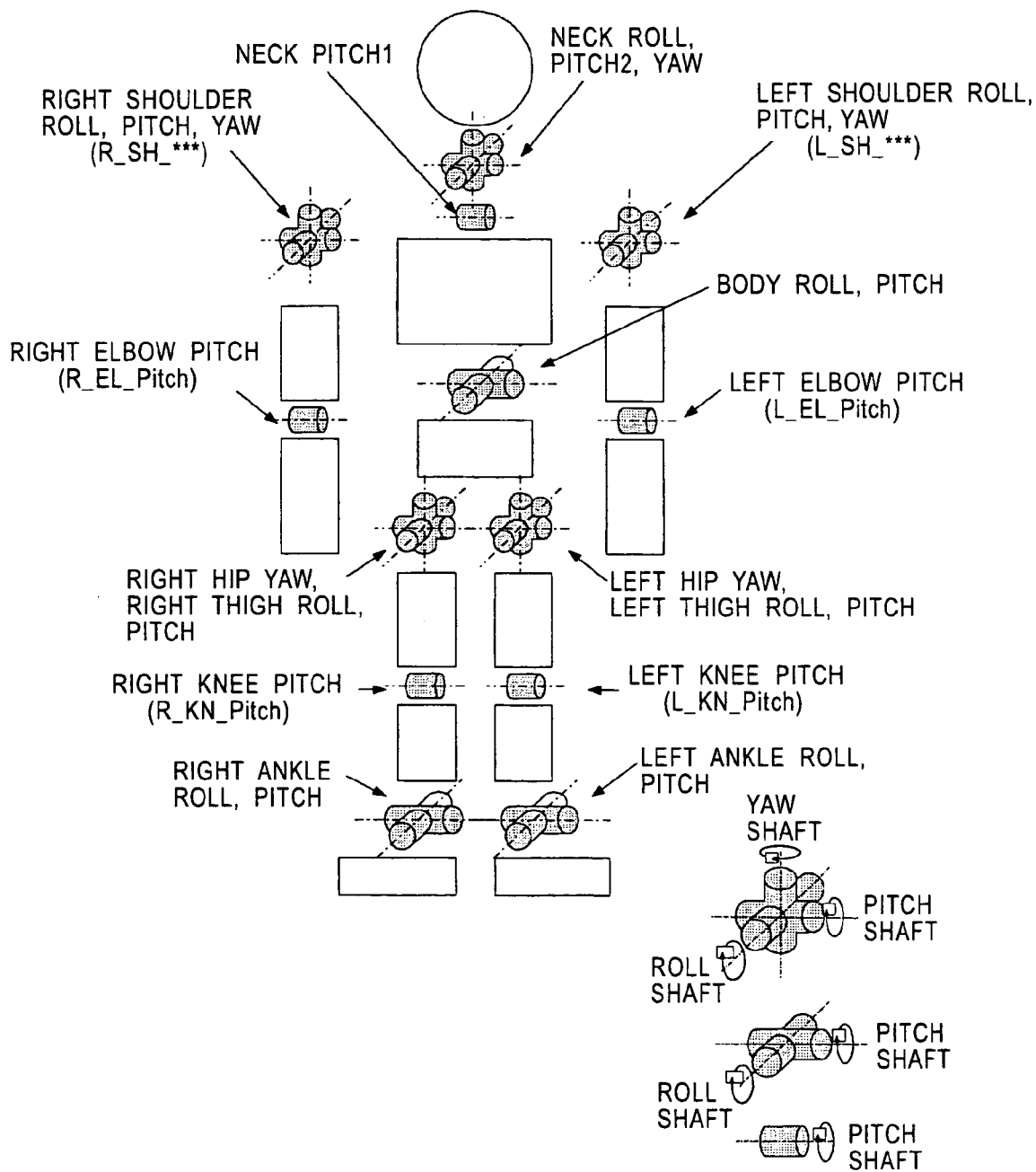
FIG. 3 is a schematic view of a configuration of the degree of freedom of joints of a legged mobile robot 100.

FIG. 3 is a schematic view of a degree-of-freedom system, with which the legged mobile robot 100 is equipped. For driving each joint shaft, an actuator motor is used.

The neck joint supporting the head has the four-degree of freedom composed of a neck-joint yaw shaft, first and second neck-joint pitch shafts, and a neck-joint roll shaft.

The arm section has the four-degree of freedom composed of a shoulder-joint pitch shaft, a shoulder-joint roll shaft, and a shoulder-joint yaw shaft of the shoulder; and an elbow-joint pitch shaft of the elbow. Furthermore, a hand section arranged at the end of the arm section, in fact, has a multi-joint and multi-degree of freedom structure (not shown) including a plurality of fingers.

Also, the body has the two-degree of freedom composed of a body pitch shaft and a body roll shaft.

Each leg section constituting a lower limb has the six-degree of freedom composed of a hip-joint yaw shaft, a hip-joint pitch shaft, and a hip-joint roll shaft of the hip joint; a knee-joint pitch shaft of a knee; and an ankle-joint pitch shaft and an ankle-joint roll shaft of the ankle. At the lower end of the leg section, a sole is arranged as a landing region during normal walking.

The legged mobile robot 100 structured as shown in FIGS. 1 to 3 can achieve two-legged walking by cooperatively controlling the operation of the entire body with the control unit. Such two-legged walking is generally performed by repeating the walking cycle divided into the following operational periods. That is:

(1) The one-leg period supported by the left leg with the raised right leg;

(2) The two-leg period with the landed right leg;

(3) The one-leg period supported by the right leg with the raised left leg; and (4) The two-leg period with the landed left leg.

The legged mobile robot 100 according to the embodiment uses a ZMP (zero moment point) as a norm for determining the posture stability of the robot. According to the posture stability determining norm by the ZMP, if a system forms a suitable ZMP space and the ZMP is located within a supporting polygon, rotational movement and translational movement are not generated in the system, so that the equation of motion about the rotation and the translation need not be solved. However, if the ZMP is not located within the supporting polygon, or the supporting point of action to surroundings does not exist, the equation of motion must be solved instead of a ZMP equation.

The ZMP equation of the robot represents the equilibrium relationship between moments applied at a control target point. The ZMP equation of the robot represented in world coordinate systems (0-XYZ) and the ZMP equation of the robot represented in local coordinate systems (0-X'Y'z') are as follows:

[Numerical Formula 1]
$$\sum_{i}^{all-particles} m_i(r_i - P_{zmp}) \times \ddot{r}_i + T - \sum_{j} M_j - \sum_{k}(S_k - P_{zmp}) \times F_k = 0$$
$$r = r' + Q$$

[Numerical Formula 2]
$$\sum_{i}^{all-particles} m_i(\bar{r}_i - \bar{P}_{zmp}) \times (\ddot{r}'_i + \ddot{Q}) + T - \sum_{j} M_j - \sum_{k}(\bar{S}_k - \bar{P}_{zmp}) \times F_k = 0$$
$$\sum_{i}^{all-particles} m_i \bar{r}_i \times (\ddot{r}'_i + \ddot{Q}) - \sum_{i}^{all-particles} m_i \bar{P}_{zmp} \times (\ddot{r}'_i + \ddot{Q}) + T - \sum_{j} M_j - \sum_{k}(\bar{S}_k - \bar{P}_{zmp}) \times F_k = 0$$
$$\ddot{r} = \ddot{r}' + \ddot{Q}$$

Each above-equation represents that the total sum of moments about the ZMP (radius $r_i - r_{ZMP}$) generated by the acceleration component applied at each mass point (or control point) $m_i$, the total sum of external force moments $M_j$ applied to each mass point $m_i$, and the total sum of moments about the ZMP generated by the external force $F_k$ ($S_k$ denotes the point of action of the k-th external force $F_k$) are in equilibrium therebetween.

This ZMP equilibrium equation includes the total moment compensation amount, i.e., the moment-error component T. By suppressing the moment errors to be zero or within the allowable range, the posture stability of the robot is maintained. That is, the modification of the robot movement to reduce the moment errors to be zero or within the allowable range is the essential of the posture stabilizing control using the ZMP as the norm for determining the stability.

In the legged mobile robot 100 according to the embodiment, a reaction-force sensor system is arranged at each region abutting the surroundings for directly measuring the ZMP and a force. Also, a velocity sensor, an acceleration sensor, and an angular sensor for directly measuring the local coordinate used for the motion control and the coordinate are arranged outside the robot. Moreover, an acceleration sensor and a posture sensor for use in a computation model at each vector position are arranged at each region of the robot.

The sensor system for motion control according to the embodiment is structured by mounting a velocity sensor, an angular acceleration sensor, and an acceleration sensor in the vicinity of the gravity center of each actuator. That is, the acceleration component applied at each control point is directly measured for each control point using the vicinity of each actuator, which is the main mass concentration region as a control point, so that the moment term about the ZMP thereby generated at the control point, the external-force moment term applied at the control point, and the moment term about the ZMP generated by the external force applied at the control point can be directly calculated for each region.

Then, in the central control unit, by sequentially adding these moment terms accumulated from each control point so as to totally sum these values, the more strict ZMP equilibrium equation can be directly introduced. Also, since the moment term is directly measured for each control point, the strict motion control can be achieved with good responsiveness and without the assumption that the robot is rigid and does not deflect by an applied external force.

Figure 4:
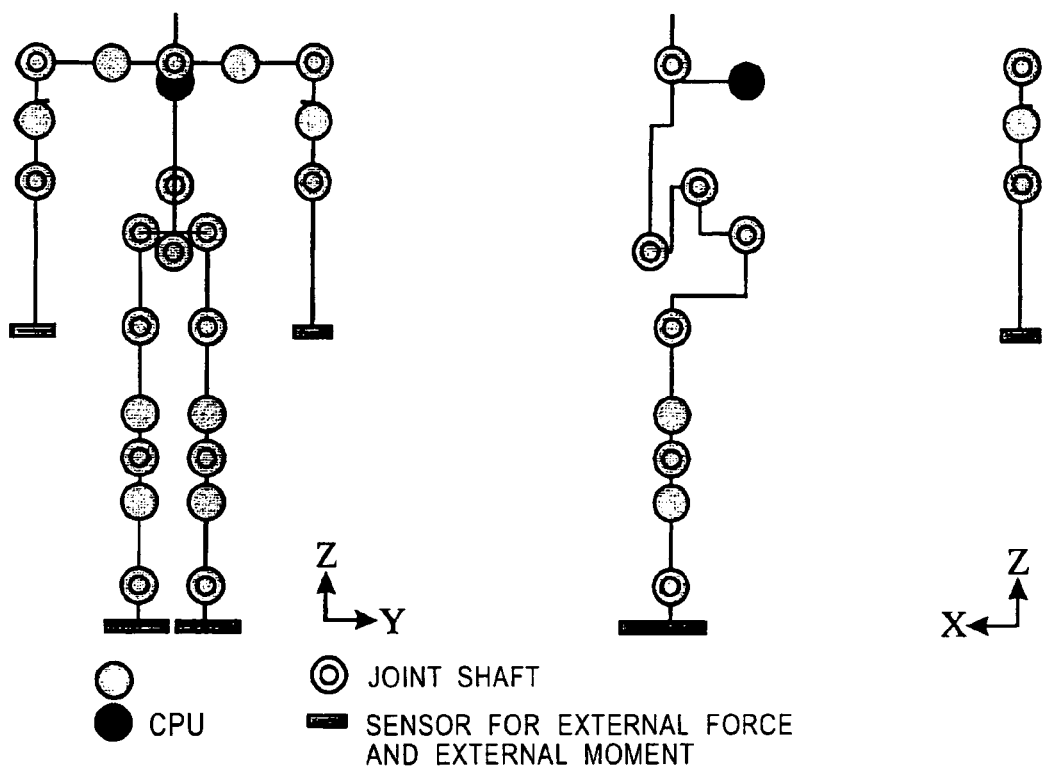
FIG. 4 is a drawing showing a situation of acceleration sensors, angular acceleration sensors, and angular velocity sensors mounted on the legged mobile robot 100 and arranged at each actuator in the vicinity of the gravity center thereof.

FIG. 4 shows situations that acceleration sensors, angular acceleration sensors, and angular velocity sensors are mounted in the vicinity of the center of gravity in each actuator of the legged mobile robot 100. As shown in the drawing, external force sensors and external moment sensors are mounted on a palm and a sole as principal contact regions to the surroundings.

As described above, in the case where in order to make assurance of the posture-stability control of the robot, acceleration sensors, angular velocity sensors, and velocity sensors are compactly arranged in various regions of the robot for transmitting sensor outputs from locals to the central control unit, it is necessary to design harness to be routed through various movable units (will be described later).

In the legged mobile robot 100 according to the embodiment, since it intends to exchange information with a human or to entertain a human by the operation of movable units, so that the mechanical movable range is large, there are several occasions that a foreign substance, such as a user's finger, etc., is pinched or caught up with the movable unit so as to remove from the operating condition assured by the control system of the robot.

Therefore, within actuators at joint regions with a large movable range being liable to pinch or catch up a user, such as an elbow and a knee, torque sensors and temperature sensors are arranged. In this case, the legged mobile robot 100 executes the operation for avoiding pinching or catching up a user's finger or a foreign substance, if it detects an output of the torque limiter at a predetermined region.

In such a case, other than the design method in that output signal lines from each sensor are wired in the robot in addition to signal lines for drive controlling actuators, there may also be a design method in that by providing a bus (common signal line) for interconnecting actuators on the robot, the drive control signals for actuators and the information by sensors housed in the actuators are transmitted together using the bus.

In order to make assurance about the interference with other objects, the detection of pinching a foreign substance, and the detection of pinching a user' finger for protecting the user, only the information of sensors within actuators, such as a torque sensor and a temperature sensor, is insufficient.

Then, according to the embodiment, contact sensors for detecting that the robot touches the surrounding (i.e., contact information) are further arranged in each region so as to obtain the sensor information outside the actuators. As the contact sensor, pressure-sensitive type and electrical-capacitance type sensors are used, for example.

Figure 5:
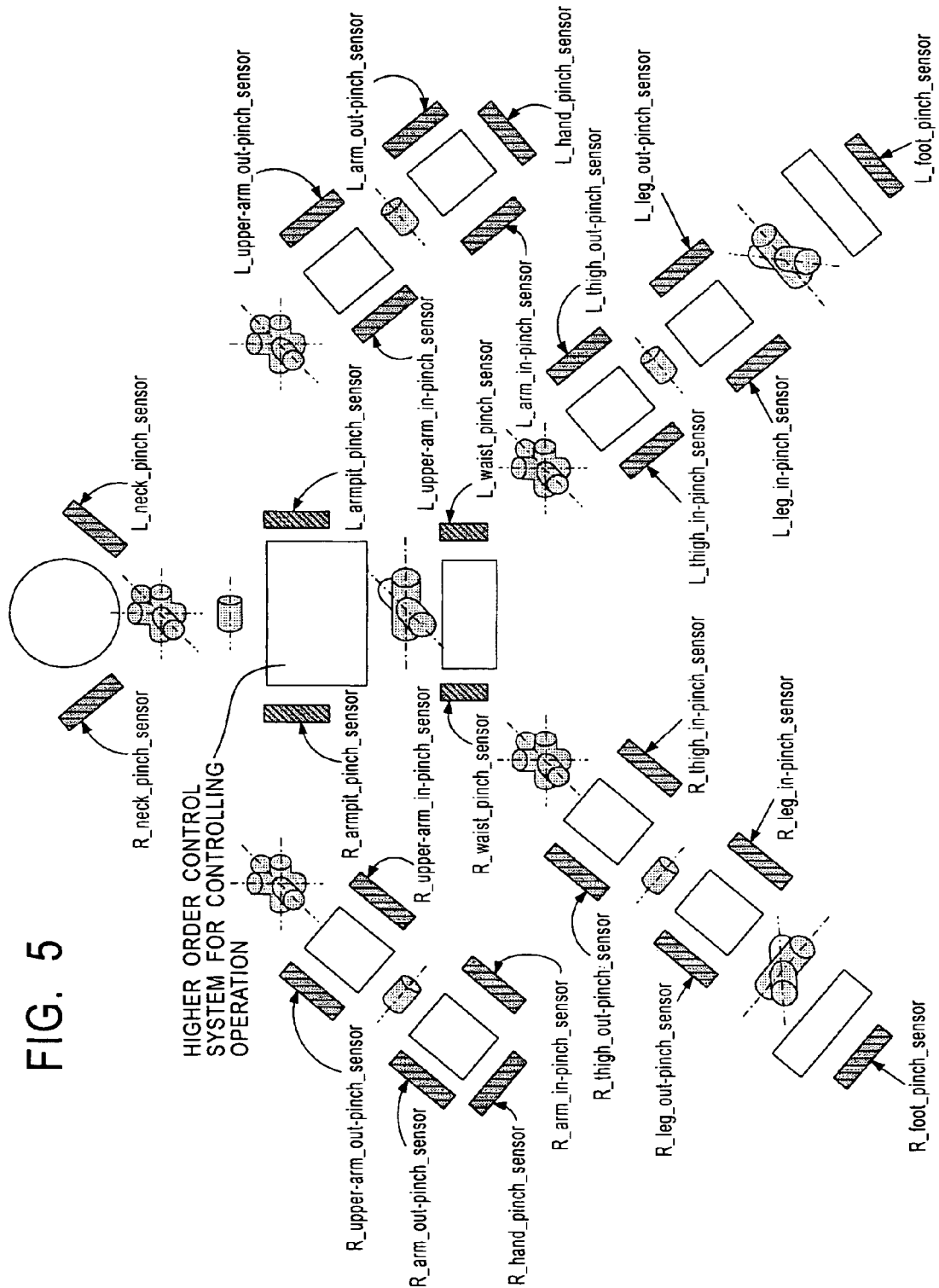
FIG. 5 is a drawing schematically showing a situation of contact sensors arranged at each region of the entire legged mobile robot 100 for detecting sandwiching or pinching part of a user's body or a foreign substance.

FIG. 5 schematically shows the situation of contact sensors arranged in each region of the entire legged mobile robot 100 for detecting pinching or catching up (pinching) part of user's body or a foreign substance.

In the head, contact sensors (R/L_neck_pinch_sensor) are arranged for detecting the pinching or catching in the bilateral cheeks and shoulders due to the drive of the neck-joint roll shaft.

In the bilateral arms, contact sensors (R/L_upper_arm_out_pinch_sensor and R/L_arm_out_pinch_sensor) are respectively arranged at the upper arm and the front arm for detecting the contact and collision to the surroundings.

Also, in the bilateral arm ends, contact sensors (R/L_hand_pinch_sensor) are arranged for detecting the contact and collision to the surroundings with pawns.

In order to detect pinching or catching part of user's body or a foreign substance between the arm section and the side surface of the body, contact sensors in the upper arms (R/L_upper_arm_in_pinch_sensor) and the corresponding contact sensors in the body side-surfaces (R/L_armpit_pinch_sensor), and contact sensors in the front arms (R/L_arm_in_pinch_sensor) and the corresponding contact sensors in the body side-surfaces (R/L_waist_pinch_sensor) are arranged, respectively.

In the bilateral leg sections, contact sensors (R/L_thigh_out_pinch_sensor and R/L_leg_out_pinch_sensor) are arranged at the thighs and the lower legs for detecting the contact and collision to the surroundings, respectively.

In order to detect pinching or catching part of user's body or a foreign substance between the bilateral arm sections, contact sensors in the thighs (R/L_thigh_in_pinch_sensor) and contact sensors in the lower legs (R/L_leg_in_pinch_sensor) are arranged.

Also, on the bilateral soles, contact sensors (R/L_foot_pinch_sensor) are arranged for detecting the leg to be landed on or raised from a floor.

When sensors outside actuators are arranged in each region of the robot in such a manner, for transmitting sensor outputs from locals to the central control unit, it is necessary to design harness to be routed through various movable units.

Figure 6:
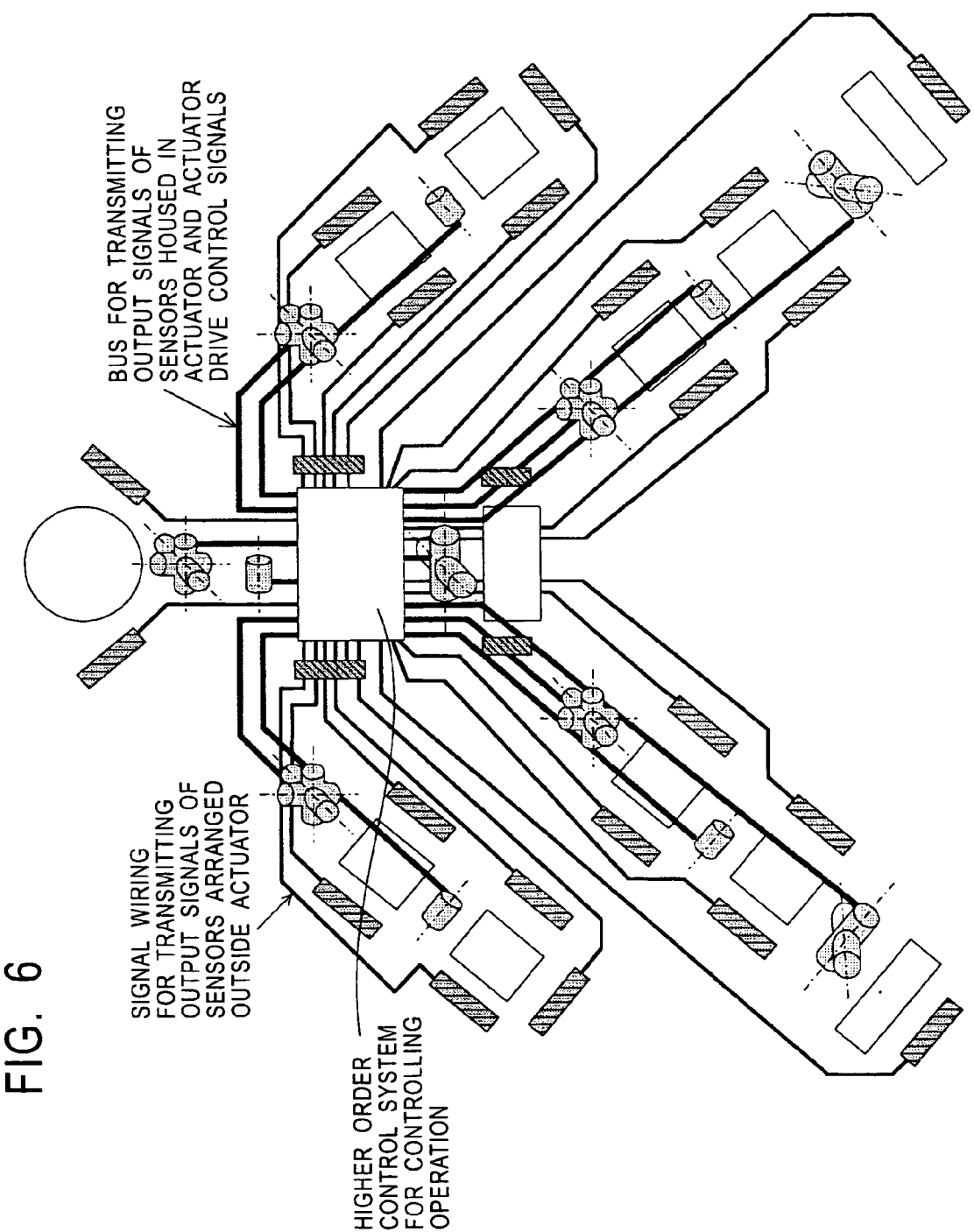
FIG. 6 is a drawing showing an example of a robot wiring structure including sensor signals for transmitting sensor information to a higher-order controller from the contact sensors arranged at each region of the entire legged mobile robot 100.

FIG. 6 shows an example of the wiring of the robot including sensor signals for transmitting the sensor information from the contact sensors arranged in each region of the entire legged mobile robot 100 to a higher-order controller.

As described above, each of actuators constituting the degree of freedom of the robot houses sensors therein for detecting the information about driving the actuator, such as a position sensor, an acceleration sensor, an angular velocity sensor, a temperature sensor, and a torque sensor. In the example shown in the drawing, a bus (common signal line) is provided for interconnecting actuators on the robot, and the drive control signals for actuators and the information by sensors housed in the actuators are transmitted to a higher-order control system using the bus. Such a bus can be designed in conformity to the bus-interface standards such as the USB (universal serial bus) so as to achieve high-speed serial communication.

On the other hand, output signals of the sensors arranged outside actuators, such as the contact sensors shown in FIG. 5, are transmitted to a higher-order control system through a signal line other than the bus. In such a case, the sensor signal line is to be comparatively long.

In the case where a sensor signal from each contact sensor disposed at the local is produced as an analogue signal, high-frequency noise is overlapped on the signal by the effect of the floating capacitance due to the long wiring route and by the increased wiring impedance. In this case, precise contact information may not be obtained in a higher-order control system.

Even in the case where the sensor signal from each contact sensor arranged in a local is communicated through a digital signal (case where a signal processing circuit is provided for each local and high-speed serial communication such as the USB is used, for example), high-frequency noise is overlapped on the signal by the effect of the floating capacitance due to the long wiring route and by the increased wiring impedance. In this case also, precise contact information may not be obtained in a higher-order control system.

In the legged mobile robot 100 shown in FIGS. 1 to 3, since there are a number of movable units while the movable range is large, large amount of wiring resists against the operation during the driving so as to generate an unexpected load in the control system, inversely affecting the posture stability of the robot. Also, the wiring is liable to be damaged by fatigue following the operation repetition.

Figure 7:
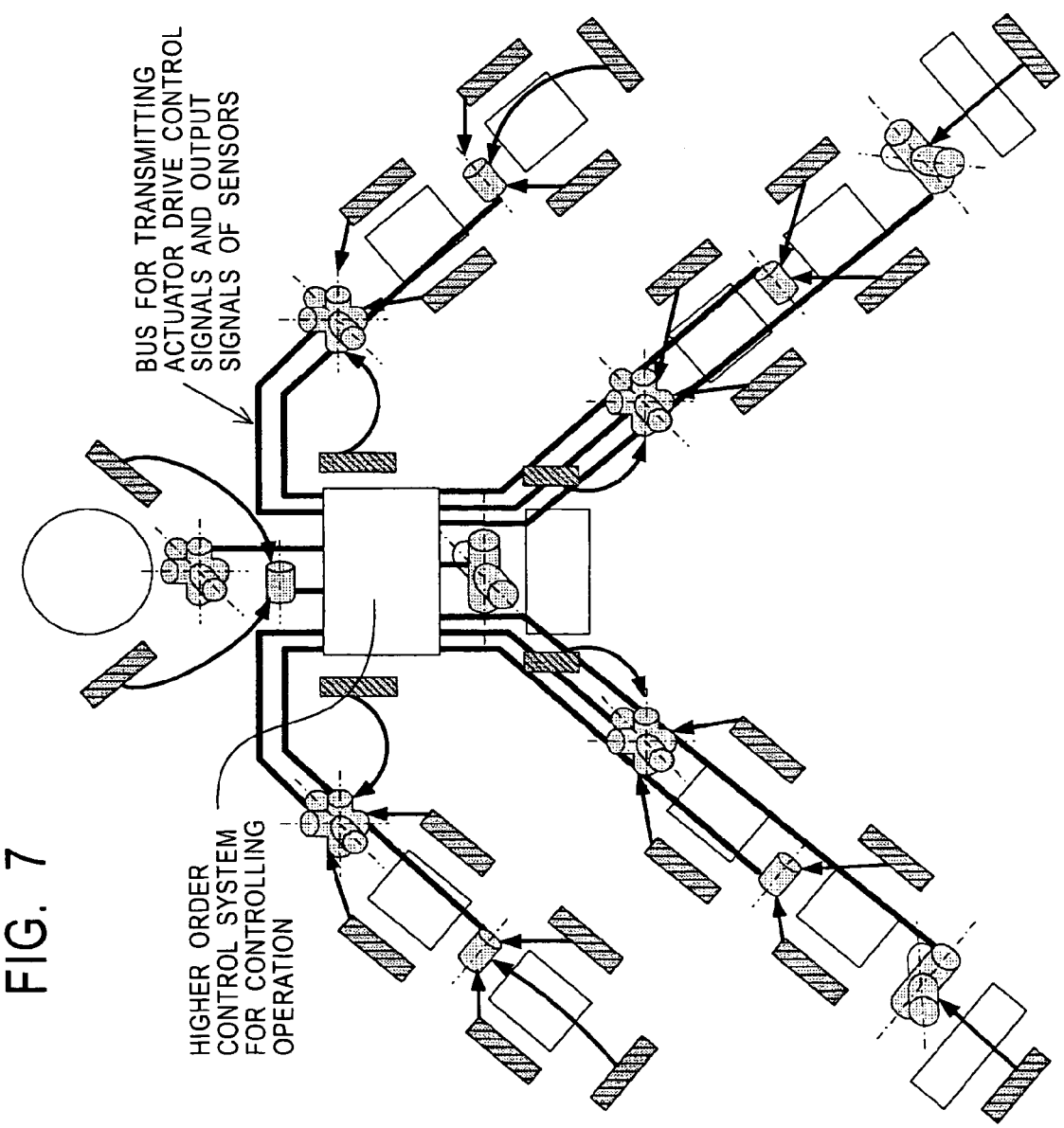
FIG. 7 is a drawing showing another example of the robot wiring structure including sensor signals for transmitting sensor information to the higher-order controller from the contact sensors arranged at each region of the entire legged mobile robot 100.

FIG. 7 shows another example of the wiring of the robot including sensor signals for transmitting the sensor information from the contact sensors arranged in each region of the entire legged mobile robot 100 to a higher-order level controller.

As described above, each of actuators constituting the degree of freedom of the robot houses sensors therein for detecting the information about driving the actuator, such as a position sensor, an acceleration sensor, an angular velocity sensor, a temperature sensor, and a torque sensor.

In the example shown in the drawing, a bus (common signal line) is provided for interconnecting actuators on the robot, and the drive control signals for actuators and the information by sensors housed in the actuators are transmitted to a higher-order control system using the bus. Such a bus can be designed in conformity to the bus-interface standards such as the USB (universal serial bus) so as to achieve high-speed serial communication.

Each actuator device is provided with an input interface for obtaining one or more sensor signals from the contact sensor arranged outside the device or other sensors. Furthermore, the actuator device is provided with a signal processing circuit and its computing power for receiving the one or more slensor inputs, and the bus interface in the actuator device is configured so as to bus-transmit the processed result of the sensor signals received from the outside sensors.

The output from a contact sensor at an arbitrary position on the robot is entered to a nearest actuator device in that the wiring route is the shortest (or joint driving is not interfered therewith). Then, in the actuator device, outputs of the outside sensors are processed to remove noise and sensor information is computed. The processed results are bus-transmitted to a higher-order control system together with drive-control signals of the actuator and sensor information from sensors housed in the actuator.

That is, according to the embodiment shown in FIG. 7, drive-control signals of the actuator, and sensor information from sensors housed in the actuator, and sensor information from sensors arranged outside the actuator device are entirely transmitted to a higher-order control system using the bus.

Accordingly, during the transmitting sensor information from sensors arranged outside the actuator device, the problem that high-frequency noise is overlapped on the signal by the effect of the floating capacitance due to the long wiring route and by the increased wiring impedance can be solved. Since the wiring structure of the robot can be simplified, designing is facilitated so as to solve the problems of increased operation load followed by excessive wiring amount and of damaged wiring due to operation repetition.

Figure 8:
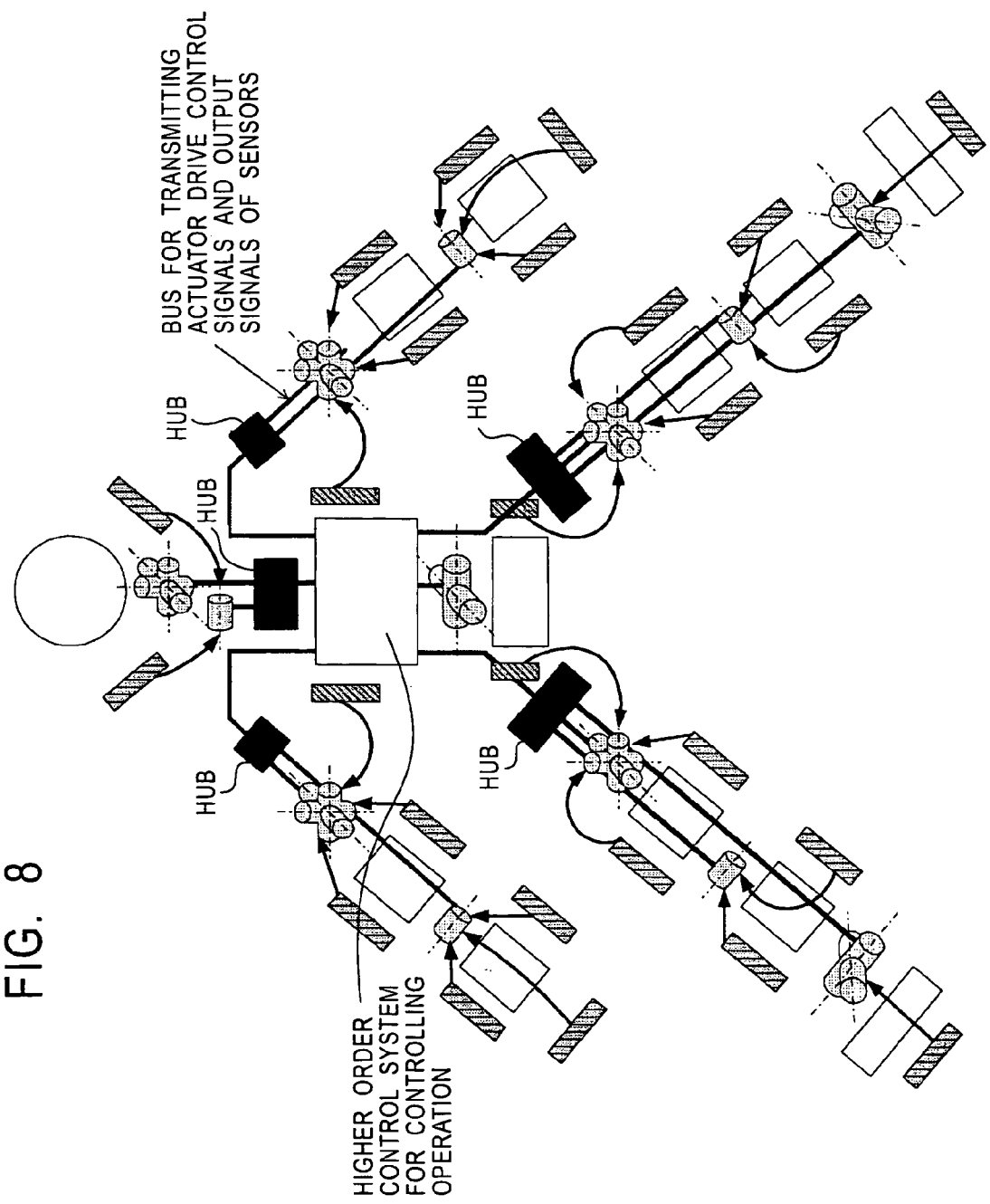
FIG. 8 is a drawing showing still another example of the robot wiring structure including sensor signals for transmitting sensor information to the higher-order controller from the contact sensors arranged at each region of the entire legged mobile robot 100.

FIG. 8 shows still another example of the wiring of the robot including sensor signals for transmitting the sensor information from the contact sensors arranged in each region of the entire legged mobile robot 100 to a higher-order controller.

As described above with reference to FIG. 7, the entire transmission on the bus of the drive control signals for actuators and of the sensor output signals can simplify the wiring structure of the robot. In the example shown in FIG. 8, by providing a hub device for concentrating transmission signal lines at each movable unit such as each of bilateral leg sections and arm sections, the wiring structure is further simplified. In this case, the number of the wiring lines passing through the movable units, such as the knee and the elbow, can be reduced smaller than that shown in FIG. 7.

Figure 9:
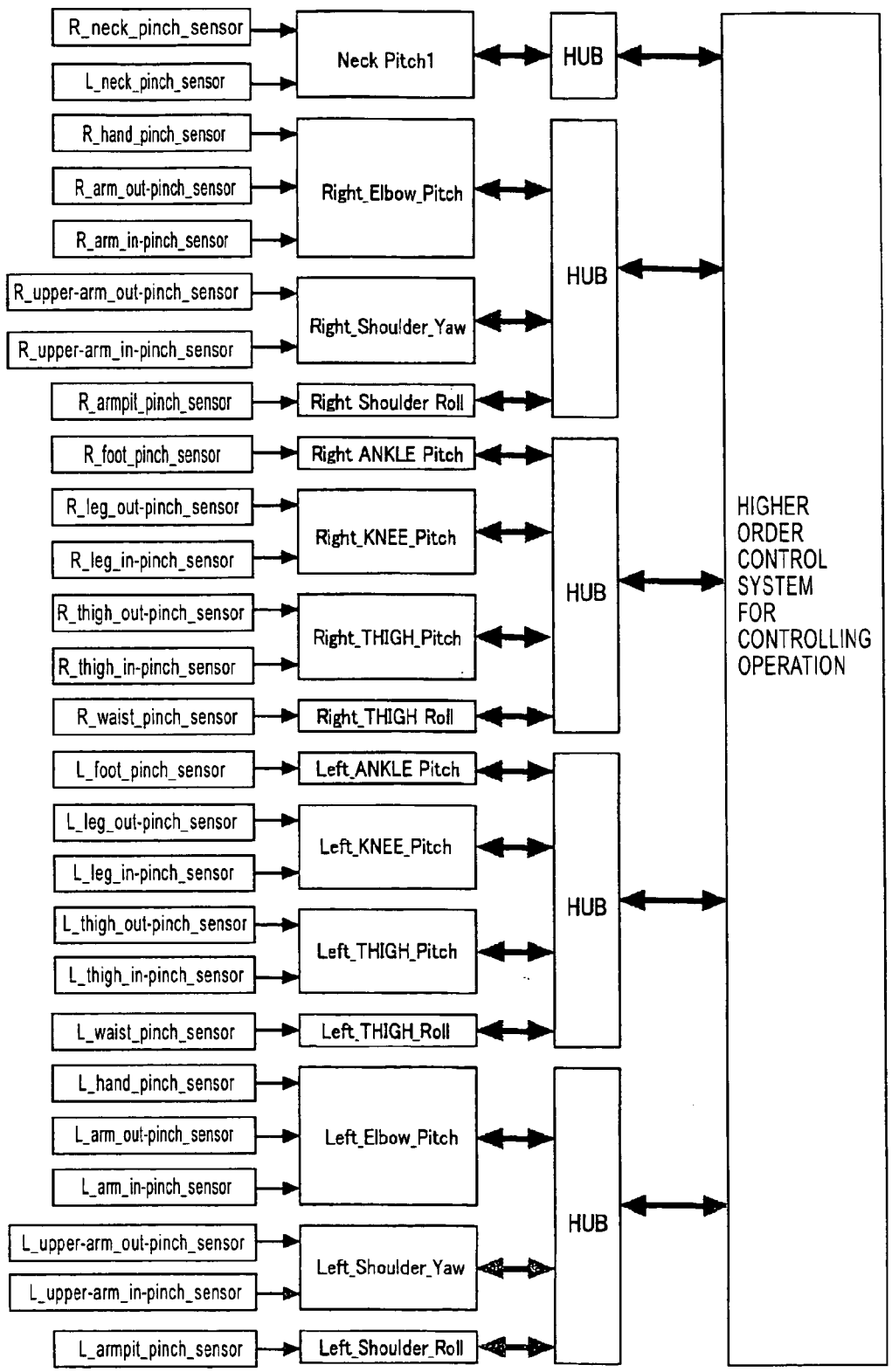
FIG. 9 is a drawing schematically showing a wiring structure for transmitting sensors arranged on the entire legged mobile robot 100 to a higher-order control system via a nearest actuator device, a hub, and a bus.

FIG. 9 schematically shows a wiring structure for transmitting signals of sensors arranged in the entire legged mobile robot 100 to a higher-order control system via a nearest actuator device, hub, and bus. However, a sensor signal of each unit may be transmitted as an analogue signal, a digital PWM signal, or a serial communication bus.

The outputs from contact sensors (R/L_neck_pinch_sensor) at the head for detecting the pinching or the catching between the cheek and the shoulder are entered to an actuator for driving a first neck-joint pitch shaft. Then, in the actuator device, the outputs are processed to remove noise and sensor information is computed.

The input-output signal lines of the actuator device for deriving the first neck-joint pitch shaft are concentrated at the hub for concentrating lines of this region, and then, are interconnected to a higher-order control system.

The sensor signals from contact sensors at the front arm (R/L_arm_out_pinch_sensor) for detecting contact and collision with surroundings, contact sensors (R/L_arm_in_pinch_sensor) at the front arm for detecting pinching or catching part of user's body or a foreign substance between the front arm and the body side surface, and contact sensors (R/L_hand_pinch_sensor) for detecting contact and collision with surroundings with fingertips are entered to an actuator for driving bilateral elbow pitch shafts, respectively.

Then, in the actuator device, the outputs are processed to remove noise and sensor information is computed.

The sensor signals from contact sensors at the upper arm (R/L_upper_arm_out_pinch_sensor) for detecting contact and collision with surroundings and contact sensors at the upper arm (R/L_upper_arm_in_pinch_sensor) for detecting pinching or catching part of user's body or a foreign substance between the upper arm and the body side surface are entered to an actuator for driving bilateral shoulder yaw shafts, respectively. Then, in the actuator device, the outputs are processed to remove noise and sensor information is computed.

The sensor signals from contact sensors at the upper arm (R/L_armpit_pinch_sensor) for detecting pinching ore catching part of user's body or a foreign substance between the upper arm and the body side surface are entered to an actuator for driving bilateral shoulder roll shafts, respectively. Then, in the actuator device, the outputs are processed to remove noise and sensor information is computed.

The input-output signal lines of the actuator device for driving the elbow pitch shaft, the actuator for driving the shoulder yaw shaft, and the actuator for driving the shoulder roll shaft are respectively concentrated at the bilateral hubs for concentrating lines of these regions, and then, are interconnected to a higher-order control system.

The sensor signals from contact sensors (R/L_foot_pinch_sensor) for detecting the leg to be landed on or raised from a floor are entered to an actuator for driving bilateral ankle pitch shafts, respectively. Then, in the actuator device, the outputs are processed to remove noise and sensor information is computed.

The sensor signals from contact sensors (R/L_leg_out_pinch_sensor) for detecting contact and collision of the lower leg section with surroundings and contact sensors (R/L_leg_in_pinch_sensor) for detecting pinching or catching part of user's body or a foreign substance between the bilateral leg sections are entered to an actuator for driving bilateral knee pitch shafts, respectively. Then, in the actuator device, the outputs are processed to remove noise and sensor information is computed.

The sensor signals from contact sensors (R/L_thigh_out_pinch_sensor) for detecting contact and collision of the thigh section with surroundings and contact sensors (R/L_thigh_in_pinch_sensor) for detecting pinching or catching part of user's body or a foreign substance between the bilateral thigh sections are entered to an actuator for driving bilateral thigh (hip joint) pitch shafts, respectively. Then, in the actuator device, the outputs are processed to remove noise and sensor information is computed.

The sensor signals from contact sensors on the body side (R/L waist_pinch_sensor) for detecting pinching or catching part of user's body or a foreign substance between the upper arm-section and the side surface of the body are entered to an actuator for driving bilateral thigh (hip joint) roll shafts, respectively. Then, in the actuator device, the outputs are processed to remove noise and sensor information is computed.

Input-and-output signal lines of the actuator device for driving the ankle pitch-shaft, the actuator for driving the knee pitch-shaft, the actuator for driving the thigh (hip joint) pitch-shaft, and the actuator for driving the thigh (hip joint) roll-shaft are concentrated at the bilateral hubs concentrating these regions, respectively, and then are interconnected with the higher-order control system.

Figure 10:
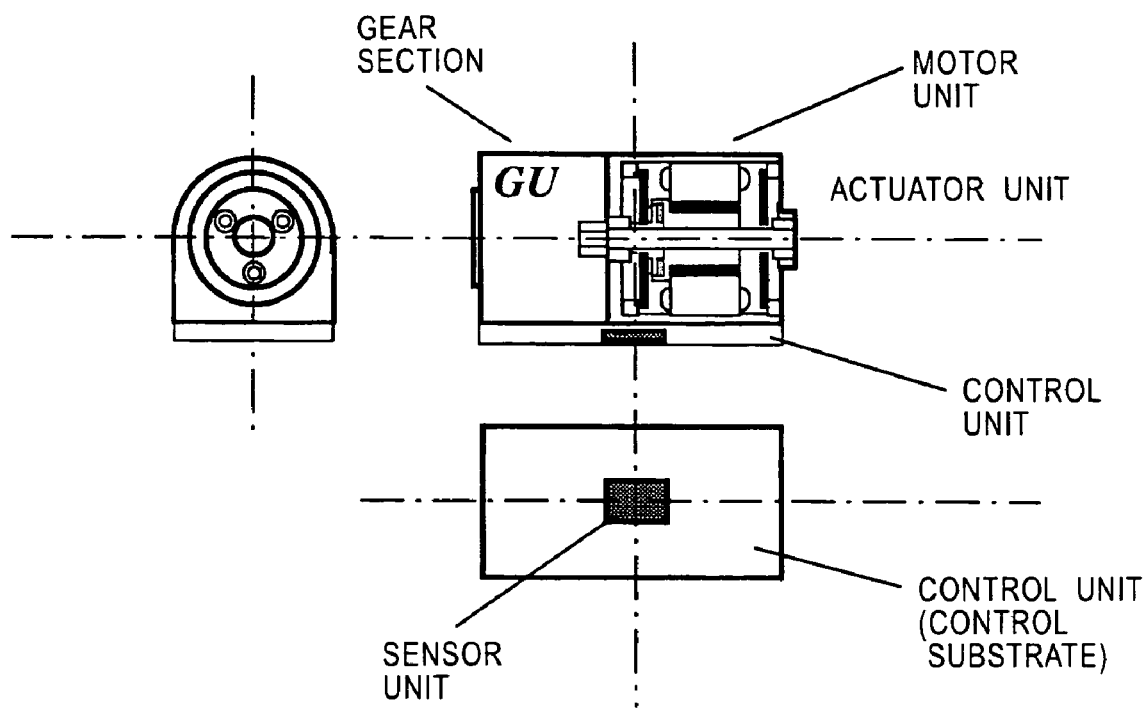
FIG. 10 is a drawing showing an example of an actuator unit according to the embodiment of the present invention.

FIG. 10 shows an example structure of an actuator unit according to the embodiment.

A joint actuator shown in the drawing includes a rotor magnet, a motor unit composed of a polyphase magnetic coil stator, a gear unit for rotationally changing the output of the motor unit, and a control unit for controlling power supply to the motor unit.

The control unit is composed of a printed circuit board, for example, and has a sensor unit mounted at substantially the center.

The sensor unit, for obtaining an input parameter of posture stability control, is provided with an acceleration sensor with 1, 2, or 3 shafts, an angular velocity sensor with 1 or 2 shafts, and an angular velocity sensor with 3 shafts combined therewith and arranged at the vicinity of the gravity center of the actuator unit. In addition thereto, sensors for detecting driving situations of the actuator, such as a torque sensor and a temperature sensor, are housed.

Figure 11:
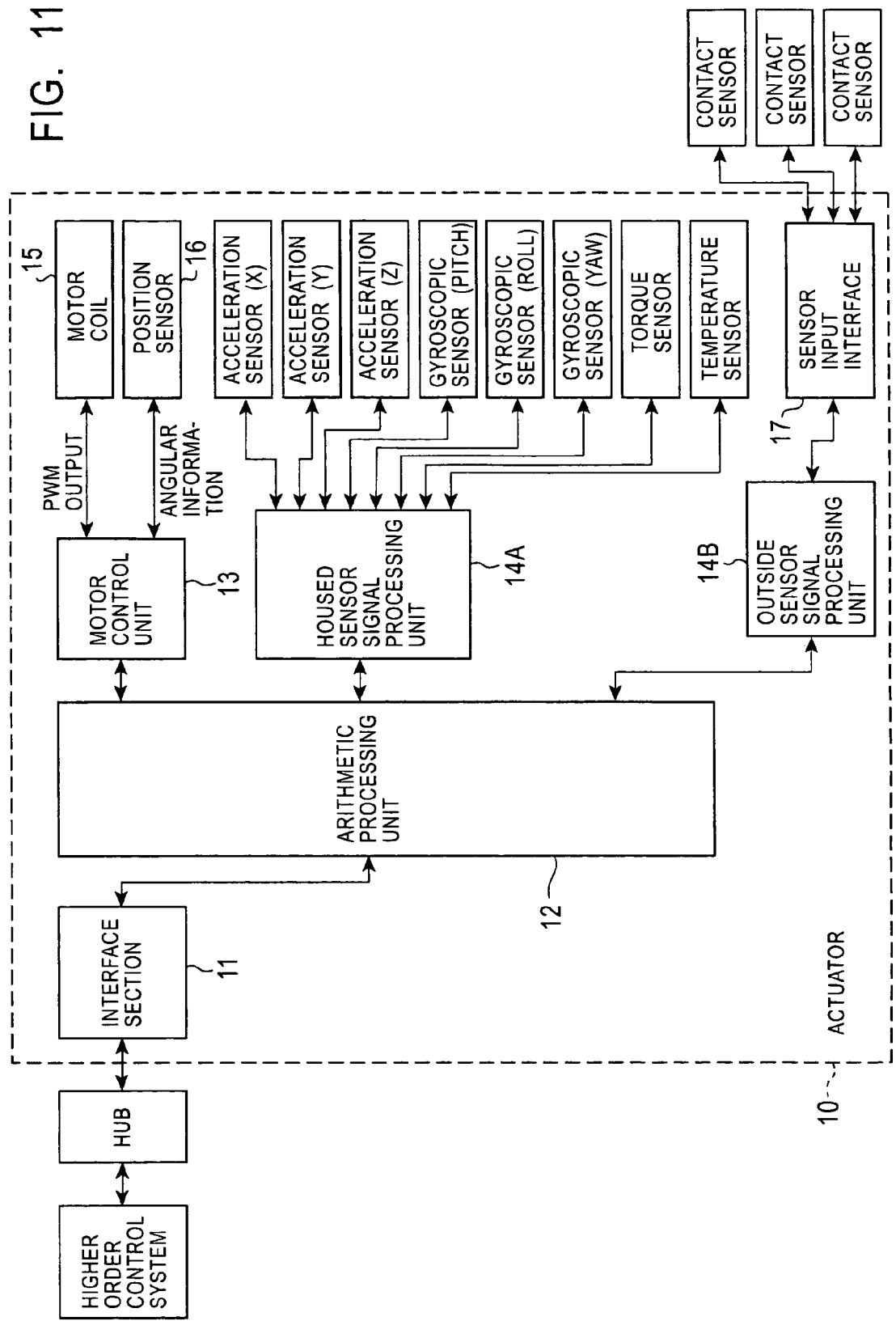
FIG. 11 is a drawing schematically showing a functional configuration of a joint actuator shown in FIG. 10.

FIG. 11 schematically shows the functional configuration of the joint actuator shown in FIG. 10. As shown in FIG. 11, an actuator 10 includes a bus-interface unit 11, an arithmetic processing unit 12, a motor control unit 13, a sensor signal processing unit 14, and a sensor input interface 17.

The bus-interface unit 11 achieves an interface protocol to the higher-order control system with the hub and the bus therebetween.

The arithmetic processing unit 12 processes a host command received via the bus-interface unit 11 so as to be transmitted to the motor control unit 13 while returning sensor information from the motor control unit 13 and the sensor signal processing unit 14 to a host controller via the bus-interface unit 11.

In order to achieve motor rotation according to the host command, the motor control unit 13 produces an electrical signal with PWM (pulse width modulation) in a motor coil 15 so as to obtain angular information from a position sensor 16 for detecting a rotational position of a rotator (not shown).

The sensor signal processing unit 14 is composed of a housed sensor signal-processing unit 14A for removing signal noise from sensor signals from the sensor housed in the actuator and an outside sensor signal-processing unit 14B for the outside sensor disposed outside the actuator device.

The sensor housed in the actuator incorporates sensor units such as acceralation sensors (X to Y), gyroscopic sensors (pitch, roll, and yaw), a position sensor, a torque sensor, and a temperature sensor.

As an outside sensor arranged outside the actuator device, there is a contact sensor arranged on a casing at each position of the robot. Sensor signals from the outside sensor are received into the outside sensor signal-processing unit 14B via the sensor input interface 17.

As already described with reference to FIGS. 7 to 9, the output from a contact sensor at an arbitrary position on the robot is entered to a nearest actuator device in that the wiring route is the shortest (or joint driving is not interfered therewith). Then, in the actuator device, outputs of the outside sensors are processed to remove noise and sensor information is computed in the outside sensor signal-processing unit 14B, and the processed results are bus-transmitted to the higher-order control system together with drive-control signals of the actuator and sensor information from sensors housed in the actuator.

According to the actuator device of the embodiment, the drive-control signals of the actuator, sensor information from sensors housed in the actuator, and sensor information from sensors disposed outside the actuator device are entirely transmitted to the higher-order control system using the bus.

Accordingly, this can solve the problems of the floating capacitance effect and that high-frequency noise is overlapped on the signal by the increased wiring impedance during transmitting sensor information from sensors arranged outside the actuator device to the higher-order control system. Since the wiring structure of the robot can be simplified, designing is facilitated so as to solve the problems of increased operation load followed by excessive wiring amount and of damaged wiring due to operation repetition.

Figure 12:
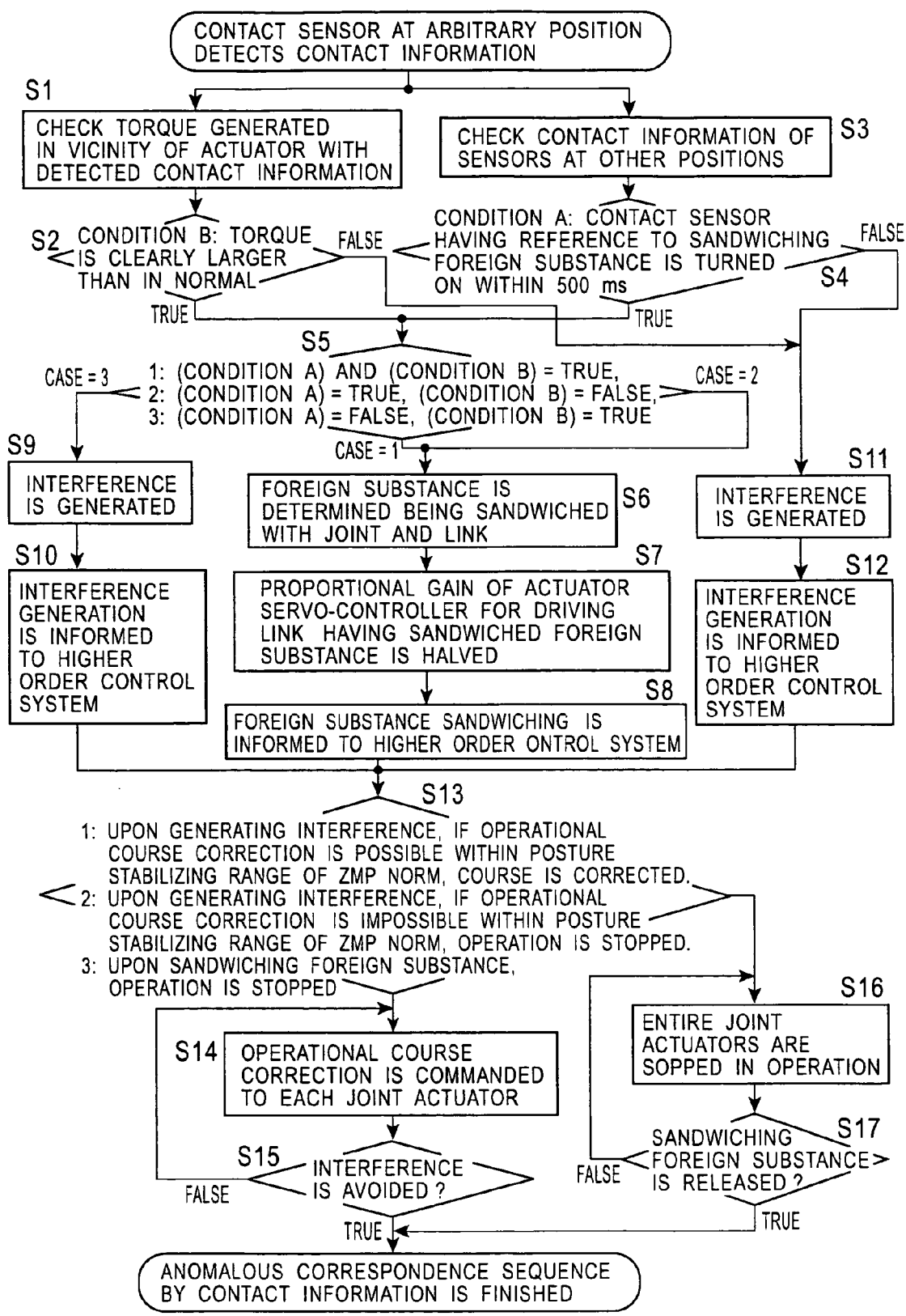
FIG. 12 is a flowchart of operation procedures of the legged mobile robot 100 using contact information from a contact sensor.

FIG. 12 is a flowchart of processing procedure of the operation of the legged mobile robot 100 using contact information from a contact sensor.

When a contact sensor at an arbitrary position detects contact information, a torque generated in the vicinity of the actuator with detected contact information is checked (Step S1). Also, contact information of sensors at other positions is checked (Step S3).

Then, if the torque is clearly larger above normal (Step S2), or if the contact sensor having reference to sandwiching a foreign substance is turned on within 500 ms (Step S4), processing according to each situation is performed.

That is, if the torque generated in the vicinity of the actuator with detected contact information is clearly larger above normal but the contact sensor having reference to sandwiching a foreign substance is not turned on within 500 ms (Case 1), or when the torque generated in the vicinity of the actuator with detected contact information is not larger above normal but the contact sensor having reference to sandwiching a foreign substance is turned on within 500 ms (Case 2), the foreign substance is determined being sandwiched with a joint and a link (Step S6) so as to halve the proportional gain of an actuator servo-controller for driving the link having the sandwiched foreign substance (Step S7) for increasing mechanical passivity (compliance). Also, the foreign substance sandwiching is informed to the higher-order control system (Step S8).

Also, if the torque generated in the vicinity of the actuator with detected contact information is clearly larger above normal while the contact sensor having reference to sandwiching a foreign substance is turned on within 500 ms (Case 3), it is determined that interference is generated (Step S9) so as to inform the interference generation to the higher-order control system (Step S10).

On the other hand, in Step S2, when the torque generated in the vicinity of the actuator with detected contact information is not larger above normal while the contact sensor having reference to sandwiching a foreign substance is not turned on within 500 ms, it is determined that interference is generated (Step S11) so as to inform the interference generation to the higher-order control system (Step S12).

Then, after informing the interference generation or foreign substance sandwiching to the higher-order control system, in Step S13, the following procedures are processed in accordance with situations of the robot. That is:

(1) Upon generating interference, if operational course correction is possible within the posture stabilizing range of ZMP norm, the course of the robot operation is corrected;

(2) Upon generating interference, if operational course correction is impossible within the posture stabilizing range of ZMP norm, the robot operation is stopped; and (3) Upon sandwiching or pinching a foreign substance, the robot operation is stopped so as to prevent the sandwiching or the pinching from being further advanced.

If the procedure executed is Case 1, the operational course is corrected, and the operational course correction is commanded to each joint actuator (Step S14). Then, until the interference is avoided, the operational course correction is repeated (Step S15).

If the procedure executed is Case 2 or Case 3, the entire joint actuators are stopped in operation (Step S16). Then, until the foreign substance sandwiching is released, the actuators continue stopping (Step S17).

According to the embodiment, joint actuators, such as the elbow and the knee, each having a large movable range so as to be liable to sandwich or pinch a user, are provided with respective torque sensors while the outer casing at every region of the robot is provided with a contact sensor for detecting contact and collision with surroundings, so that the sandwiching or pinching can be automatically detected based on outputs of these sensors.

By operating according to the processing procedures described above, if the legged mobile robot detects the pinching of a user's finger, etc., at a predetermined region, the operation for avoiding the pinching is executed. Thereby, the robot for the purpose of exchanging information with a human or entertainments with mechanical operation of its movable units is prevented from pinching a user's finger, etc. Then, there are advantages of providing a protective robot and of not inflicting awful feeling to a human so as to exchange information with the robot at ease.

While the present invention has been described in detail with reference to a specific embodiment, it is apparent that one skilled in the art can make modifications and variations within the spirit and scope of the invention.

The gist of the present invention is not necessarily limited to a product called a "robot". That is, even a mechanical apparatus in the other industrial fields, such as a toy, can also incorporate the present invention as long as it simulates human operation with electrical or magnetic functions.

In short, the present invention has been disclosed as exemplification so that the description of this specification must not be limitedly interpreted. In order to determine the gist of the present invention, the appended Claims must be taken into consideration.

What is claimed is:

1. A legged mobile robot comprising:
   at least a plurality of movable legs; actuator devices for driving the movable legs;
   a higher-order control system for controlling the robot;
   sensors including at least one of a position sensor, an acceleration sensor, an angular velocity sensor, and a torque sensor, said sensors housed in every joint-actuator device for detecting driving situations of the actuator device; and
   a sensor disposed outside the actuator device for detecting contact and collision with surroundings,
   wherein the actuator device comprises an input interface for receiving a sensor signal from at least the one sensor disposed outside the actuator device; a signal processing unit for removing noise from sensor signals received from the sensors housed in every joint-actuator device and the sensor disposed outside the actuator device; and an arithmetic processing unit for drive-controlling an actuator motor and for processing sensor-information according to a command from the higher-order control system.

2. A robot according to claim 1, wherein an output from a contact sensor disposed at an arbitrary position on the robot is entered to a nearest actuator device in that a wiring route is shortest, and in the actuator device, an output of the sensor disposed outside the actuator device is processed to remove noise and sensor information is computed.

3. A robot according to claim 1, further comprising a bus provided on the robot for interconnecting the higher-order control system and the actuator devices, wherein via the bus, the actuator device transmits actuator drive-control signals to and from the higher-order control system and also transmits sensor information from the sensors housed in the actuator device and the sensor disposed outside the actuator device.

4. A robot according to claim 1, further comprising a hub device provided at every movable unit for concentrating transmission signal lines.

5. A robot according to claim 1, wherein the arithmetic processing unit determines that interference is generated when torque generated in the actuator device disposed in a vicinity of a region with detected contact information is increased clearly larger above normal while a contact sensor having reference to pinching a foreign substance is turned on within a predetermined period of time.

6. A robot according to claim 1, wherein the arithmetic processing unit determines that a foreign substance is pinched between a joint and a link when torque generated in the actuator device disposed in a vicinity of a region with a detected contact information is increased clearly larger above normal while a contact sensor having reference to pinching a foreign substance is not turned on within a predetermined period of time, or when the torque generated in the actuator device disposed in the vicinity of the region with the detected contact information is not increased larger above normal while the contact sensor having reference to pinching a foreign substance is turned on within a predetermined period of time.

7. An actuator device applicable to a joint shaft of a legged mobile robot comprising: an actuator motor; a sensor housed in the device for detecting actuator driving situations; an input interface for receiving sensor signals from at least one outside sensor disposed outside the device; a signal processing unit for removing noise from sensor signals from the sensor housed in the device and from the outside sensor; a bus interface for transmitting actuator drive-control signals to and from a higher-order control system and also for transmitting sensor information from the sensor housed in the actuator device and the sensor disposed outside the actuator device via a bus; and an arithmetic processing unit for drive-controlling the actuator motor and for processing sensor information according to a command from the higher-order control system.

8. A device according to claim 7, wherein the sensor housed in the device comprises at least one of a position sensor, an acceleration sensor, an angular velocity sensor, a torque sensor, and a temperature sensor.

9. A device according to claim 7, wherein the outside sensor is one of a contact sensor and a pressure-sensitive sensor for detecting contact and collision with surroundings.

10. A device according to claim 7, wherein sensor signals are received from a nearest outside sensor via the input interface so as to reduce a wiring route length to a shortest.

* * * * *

UNITED STATES PATENT AND TRADEMARK OFFICE
CERTIFICATE OF CORRECTION

| | | |
|---|---|---|
| PATENT NO. | : 7,061,200 B2 | Page 1 of 1 |
| APPLICATION NO. | : 10/731155 | |
| DATED | : June 13, 2006 | |
| INVENTOR(S) | : Masatsugu Iribe | |

It is certified that error appears in the above-identified patent and that said Letters Patent is hereby corrected as shown below:

Title page, column 1, item 54, change "JOIN" to --JOINT--.

Column 1, line 2, change "JOIN" to --JOINT--.

Column 13, line 14, change "ore" to --or--.

Signed and Sealed this

Sixth Day of March, 2007

JON W. DUDAS
*Director of the United States Patent and Trademark Office*